ABSTRACT OF THE DISCLOSURE

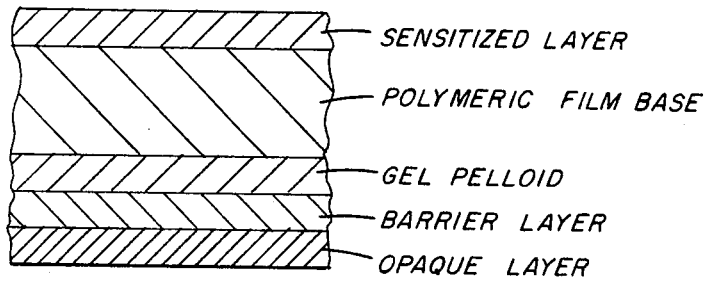
FIG. 1
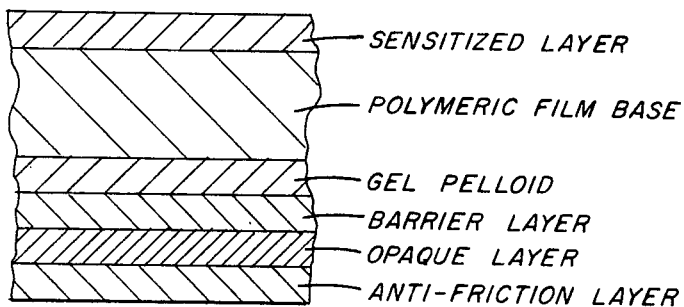
FIG. 2
JOHN F. BISHOP
WALKER F. HUNTER
MARTIN E. ROWLEY
INVENTORS
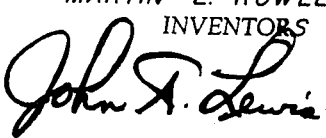
ATTORNEY 3,677,790
READILY REMOVABLE OPAQUE PROTECTIVE LAYERS AND ARTICLES CONTAINING THEM
John F. Bishop, Webster, and Walker F. Hunter, Jr., and Martin E. Rowley, Hilton, N.Y., assignors to Eastman Kodak Company, Rochester, N.Y.
Application Oct. 28, 1968, Ser. No. 788,109, now Patent No. 3,598,591, dated Aug. 10, 1971, which is a continuation-in-part of application Ser. No. 645,032, June 9, 1967. Divided and this application Aug. 12, 1970, Ser. No. 63,292
Int. Cl. G03c 1/84
U.S. Cl. 117—33.3
5 Claims

Readily removable opaque coatings over one or both sides of a photographic or radiographic film, which coatings can be removed in a single piece, can be manufactured by applying over the film a multilayer coating composition comprising
(a) a first "barrier" layer containing one or more water soluble polymers that are compatible with gelatin and that adhere tenaciously to the "opaque" layer (b) and
(b) an "opaque" layer (over the "barrier layer") composed of a blend of finely divided carbon and at least one water-insoluble polymer.

The "opaque" layer must be fairly permeable to water, so that when it is desired to remove the "opaque" coating, the film can simply be immersed in water. Within a very short time the "opaque" layer falls away from the film in a single piece, rather than in small troublesome flakes.

---

This application is a division of U.S. patent application Ser. No. 788,109, filed Oct. 28, 1968, now Pat. No. 3,598,-591 which in turn is a continuation-in-part of U.S. patent application Ser. No. 645,032, filed June 9, 1967 (now abandoned).

This invention relates to both photographic and radiographic sheets. More specifically, this invention relates to sensitized films having a unique, removable opaque coating and to specially coated polymeric sheets from which such sensitized films can readily be manufactured.

In certain photographic applications, it is advantageous to remove exposed film from a camera and then simultaneously develop and "print" an appropriate photograph either immediately, or within a short time thereafter; this developing and printing generally (but not necessarily) being done outside the camera. Illustrative of this type of photographic process is the well-known "photograph-in-a-minute" (or even less time) involving a so-called "film unit" in which (after exposure of the sensitized emulsion layer in the camera) both the negative and positive images are simultaneously developed, usually shortly after exposure of the negative. Then the positive "print" or photograph (in color or in black and white) can be stripped from the "film unit" as a practically finished photographic product. One of the major shortcomings of this type of process heretofore is that there has been available no practical way to "preserve" the transparent negative part of the "film unit" for reuse and/or preservation of the precise photographic record.

Several requisites exist for such a "reusable" negative. One such requisite is that the sensitized film product have a coating on the reverse side of the film base (on the side opposite the sensitized surface) that is essentially opaque to actinic light. Such a coating must have an optical density of at least 6 (and preferably at least about 8) over the entire visible spectrum. In addition, the final sensitized film product must be extremely thin (i.e., no more than about 6 mils thick). Generally the sensitized product cannot be utilized in existing "film pack" type photographic equipment of the most convenient type unless its total thickness (including film base, sensitized layer(s), "sub," pelloid, anti-static and/or anti-halation layer(s), and opaque backing) is less than about 6 mils. Usage of the product in such "film packs" also requires that the film be extremely flexible. Thus, the opaque backing that is utilized must not only have excellent light-absorbing properties, but it must also be very flexible; it must adhere tightly to the sensitized film; and it must be extremely resistant to "flaking" or breaking loose from the film base during handling, manufacture, exposure (in the camera), and development of the photograph after exposure.

The necessity for the opaque backing can be readily appreciated when it is realized that the type of "development" to which such sensitized films are usually subjected involves (a) the removal of the film from the camera after it is exposed (during which removal, a "pod" of developing reagents is squeezed, with the reagents being spread evenly across the surface of the exposed film between the exposed sensitized surface and a "receiver" sheet), (b) the holding of the exposed film unit for a period of time outside the camera (to permit the completion of the development of the image and concomitant transfer of the developed image to the receiver sheet), and (c) finally the separation of the receiver sheet (containing the positive image) from the "negative." Note that during the developing period, the film unit is outside the camera. It is during this critical (development) period that the opaque backing is necessary because, while the receiver sheet can serve to protect the exposed, developing sensitive layer from incident light striking the film unit from one side, the sensitive layer must also be protected (during the critical "developing" period) from extraneous light that strikes the film unit from the reverse side. Conventional heavy paper or separate opaque layers are either too bulky or too inflexible to be useful in the manner required for the film units described above.

Two additional requirements that exist for the manufacture of acceptable film units for purposes such as those described above are (a) the opaque backing must be removable in as short a time as possible (preferably in less than 1 minute) from the "negative" film base after it is developed, and (b) the opaque backing must be removable from such developed "negative" in a single piece (or at most a few large pieces).

It has been discovered that all of the criteria set out above can be met by utilizing a sensitized film that has been coated (on the side opposite from the sensitized side) with two layers. The first layer (hereinafter termed the "barrier" layer or "barrier" coating) consists essentially of a polymeric material that is soluble in water. Preferably (but not necessarily) such polymeric material should be insoluble in relatively highly concentrated aqueous solutions. The second layer (hereinafter referred to as the "opaque" layer or coating) is (a) insoluble in water, (b) permeable to water, (c) contains enough carbon to make it practically impermeable to visible light, and (d) also contains a fairly high proportion of a polymeric material having the necessary "tenacity" (to hold together the "opaque" layer in the form of a film even after the polymeric material in the "barrier" layer has been dissolved in water, thereby making it possible to strip this opaque layer from the base in a single piece whenever it is desired to do so), as well as the necessary "flexibility" (to be subjected to the sharp flexing that occurs in the film pack inside the camera, for example, when the film is pulled or rolled over spacers and rollers having very limited clearances, without cracking, crazing or flaking during such flexing).

Thus, in the practice of one aspect of this invention, a "film unit" having a "negative" portion comprising a light-sensitive layer, a conventional "subbing" layer, a polymeric film base, another conventional "sub" layer, a clear, conventional "pelloid" layer, a "barrier layer" (in accordance with the present invention), and an "opaque layer" (also in accordance herewith), all in that order is first exposed and then developed for the prescribed number of seconds to obtain the desired photograph. Then the negative (still containing intact the protective "opaque" layer and the "barrier" layer) can be transferred into a suitable storage container in which it can be transported to a place where the negative can be "fixed" under more convenient conditions. Actually at any convenient time after the development of the negative, the "opaque layer" can be removed simply by immersing the developed negative for a very short time into either a water bath or a dilute aqueous solution of some kind. In relatively pure water, the "barrier layer" immediately becomes soft and then dissolves, thereby permitting the "opaque" layer to be easily stripped from the film base in a single piece. The fact that the "opaque" layer can be stripped from the film in a single piece is of great significance because, heretofore, layers that were removable from film during the processing of the film generally either "flaked" from the film in pieces of varying size that were often bothersome because it was very difficult to separate them from the film and from the processing solutions, which in turn were difficult to clean up. In the practice of the present invention, removed "opaque" layers remain in a single piece and can thus be readily removed from the processing solutions. The "barrier" layer dissolves in the water bath but, since it is preferably colorless, its presence in the solutions is not particularly troublesome.

The drawings illustrate two embodiments of the final protected sensitized film aspect of the present invention. In FIG. 1, for example, there is shown a polymeric film base having coated on one surface thereof a "sensitized" layer, which can be any of a multitude of conventional materials (for example, silver halide emulsions and the like) having an ability to form latent, developable images when they are exposed to light or X-ray radiation. On the reverse side of the film base there are coated, in turn, a conventional "pelloid" layer (generally applied to minimize "curl" in the film caused by the sensitized layer), a "barrier" layer (in accordance with the following detailed description), and an "opaque" layer (which will also be described in detail below). The pelloid layer is not essential, however, for the successful practice of this invention.

FIG. 2, which illustrates a preferred embodiment of this invention shows a typical photographic film having, in addition to the layers described above, a final "backing" layer consisting of material having the desired effect of reducing or minimizing the frictional and blocking characteristics of the black layer of the film unit.

As it was stated hereinbefore, the "barrier" layers of this invention consist essentially of one or more polymers having the ability to dissolve readily in water. The "barrier" layers also present the migration of carbon (from the "opaque" layer) into the pelloid layer. However, useful polymers must also have the ability to cause the "opaque" layer (of the present invention) to adhere tenaciously to the film base and/or pelloid layer (much as a "sub" causes a gelatin emulsion layer to adhere to the film base) during ordinary handling and storage. Also, the water-soluble polymer must be of the type that produces relatively low adhesion when it is wet with water. In addition it must be compatible with gelatin, forming a good bond with conventional gel type pelloids. Thus, not all water soluble polymers can be used successfully in the "barrier" layers of the present invention. Also, it is essential that the polymer that is present in the "barrier" layer in greatest amount be compatible with gelatin emulsions (in a test such as that illustrated in Example I, below). Still another test that this so-called "barrier" polymer must meet successfully is an adhesion test involving the procedure that is also detailed in Example I, below. Thus, acceptable "barrier" polymers must also be able to cause one of the "opaque" layers of the present invention to adhere tenaciously to the pelloid layer and/or the film base itself. Acceptable "barrier" polymers, therefore, can generically be characterized as (a) being soluble in water (to levels of at least about 5 weight percent);
(b) exhibiting 1% aqueous solution viscosities of at most about 10 poises;
(c) being compatible with gelatin coatings;
(d) having molecular weights of at least about 50,000; and
(e) causing one of the "opaque" layers of this invention to adhere to the gelatin coating.

When the "barrier" and "opaque" coatings of this invention are directly subjected to developer solutions and the like (as for example when they are used for coatings on radiographic or motion picture films) wherein, during at least the initial processing, it is preferred that the "opaque" coating remains attached to the transparent negative, it will be necessary to impose still another requirement upon the "barrier" polymers that are useful. Thus, preferred "barrier" polymers that are particularly useful in this type of development (wherein they are exposed to concentrated aqueous solutions during a period of time when it is preferred that they remain in place over the film) have the additional requirement that they be essentially insoluble in water solutions containing more than about 5 weight percent of dissolved ionizable material. Typical (non-limiting) examples of acceptable "barrier" polymers include the commercially available hydroxypropyl celluloses, alkali metal salts of ethyl celluose sulfate, copolymers of acrylic acid and ethylacrylate, carboxymethyl celluloses, and alkila metal salts of copolymers of methyl acrylate and acrylic acid. An example of a material that is preferred in accordance with the foregoing general description is sodium ethyl cellulose sulfate. Preferred alkali metal ethyl cellulose sulfates are those containing from about 34 to about 40 percent ethoxyl and from about 4 to about 7 percent combined sulfur, and having an intrinsic viscosity of from about 0.4 to about 0.8 (measured in dimethyl sulfoxide+1% potassium iodide).

EXAMPLE I

"Barrier" polymer tests

In order to determine whether a particular polymer has (a) the necessary compatibility with gelatin and (b) the necessary degree of adherence with one of the "opaque" coatings (which will be described in detail below) in order to be an acceptable "barrier" polymer, the following test is performed:

First, more than about 5 weight percent solution of the polymer being tested (in distilled water) is coated on either a conventional cellulose acetate or a conventional poly(ethyleneterephthalate) film base that has been coated initially with about 0.2 mil thick layer of a conventional dried "gel" pelloid (about 0.09 pound of gelatin per 100 square feet). A total of 1 pound of the solution of 6.3 percent "barrier" polymer per 100 square feet is applied to the gel pelloid. It is then dried in a circulating air drying oven at a temperature of about 100° F. for about 1–3 minutes. Then a 10 weight percent aqueous solution consisting of the following:

| Ingredient: | Parts by weight |
|---|---|
| Carbon [1] | 4 |
| Na ethylacrylate-acrylic acid copolymer [2] | 6 |
| Distilled water | 87 |
| Isopropyl alcohol | 1.3 |
| n-Butyl alcohol | 1.3 |
| Surfactant [3] | 0.4 |

[1] Average particle size of about 0.5 micron.
[2] Intrinsic viscosity=0.7 (in methanol).
[3] Na salt of alkylaryl polyether sulfate.

is applied over the "barrier" coating at a rate of 2.5 pounds of the solution per 100 square feet. It, too, is dried in the same manner as the "barrier" coating.

The resulting coated film is conditioned at a relative humidity of 15% for 24 hours and then scratched deeply with a sharp knife or razor blade. Across this scratch is pressed a piece of conventional pressure sensitive tape. The tape is immediately stripped quickly from the scratched surface and observed. If the prospective "barrier" polymer has the necessary compatibility and adherence qualities, no more than a small amount of the "opaque" layer is removed along with the tape, while unacceptable polymers (i.e., prospective "barrier" polymers) fail in this test by permitting a large amount of the "opaque" coating to be stripped off the film unit along with the tape. In Table I, below, is listed results from a series of such "dry adhesion and compatibility" tests.

Table I also tabulates test data involving a so-called "wet stripping" test in which a prospective "barrier" polymer must also perform successfully in order to be considered acceptable. This test involves simply immersing an unscratched portion of the above-described test film in room temperature water for 2 minutes, and then immediately trying to peel the "opaque" coating away from the film. Acceptable "barrier" polymers must soften and effectively dissolve in the water, releasing the "opaque" coating completely in this period of time. Optimum "barrier" polymers are rated "good" in both tests, while those rated "poor" in either test are generally considered to be unacceptable. Note that certain combinations of polymers actually yield better test results than do either of the individual polymers.

TABLE I

| Test No. | Polymer tested | Dry adhesion and compatibility | Wet stripping |
|---|---|---|---|
| 1 | Hydroxypropyl cellulose | Poor | Good. |
| 2 | Sodium ethyl cellulose sulfate | Good | Fair. |
| 3 | Carboxylated acrylic copolymer [1] | Fair | Do |
| 4 | Polyvinylpyrrolidone | Good | Poor. |
| 5 | Polysaccharide [2] | do | Do. |
| 6 | Ethyl cellulose phthalate (28% ethoxyl) | do | Do. |
| 7 | Sodium salt of copolymer of ethyl acrylate-acrylic acid | do | Do. |
| 8 | Polysaccharide [3] | Poor | Good. |
| 9 | Carboxymethyl cellulose | Fair | Do. |
| 10 | Sodium salt of methyl acrylate-acrylic acid copolymer | Good | Do. |
| 11 | Polyvinyl alcohol | Poor | Do. |
| 12 | Polyethylene oxide | do | Do. |
| 13 | Sodium alginate | Good | Poor. |
| 14 | Animal glue | do | Do. |
| 15 | 67% hydroxypropyl cellulose plus 33% polyvinylpyrrolidone. | Poor | Fair. |
| 16 | 50% hydroxypropyl cellulose plus 50% ethyl acrylateacrylic and copolymer. | do | Good. |
| 17 | 50% hydroxypropyl cellulose plus 50% 1,2,6-hexanetriol. | do | Do. |
| 18 | 25% hydroxypropyl cellulose plus 75% 1,2,6-hexanetriol. | do | Do. |
| 19 | 33% hydroxypropyl cellulose plus 67% sodium ethyl cellulose sulfate. | Good | Do. |
| 20 | 50% hydroxypropyl cellulose plus 50% sodium ethyl cellulose sulfate. | Fair | Do. |
| 21 | 67% hydroxypropyl cellulose plus 33% sodium ethylcellulose sulfate. | Good | Do. |

[1] Sold by National Starch Company under the trade name "Resyn 78-3205."
[2] Sold by Stein, Hall & Co, under the trade name "Stractor."
[3] Sold by Stein, Hall & Co. under the trade name "Polymer 705 D-A."

The latter combinations illustrated in Table I, above, include combinations of hydroxypropyl cellulose and sodium ethyl cellulose sulfate, which combinations are also particularly preferred embodiments of the present invention. Thus, "barrier" coatings that consists essentially of mixtures of hydroxypropyl cellulose and alkali metal salts of ethyl cellulose sulfate containing at least about 15% (preferably at least about 25%) of alkali metal ethyl cellulose sulfate have been found to perform in an optimum manner.

The "opaque" coating

The opacity of the "opaque" layer or coatings of the present invention is preferably due to the presence in the layer of from about 10 to about 45 (and preferably between about 30 and about 40) weight percent of total solids of finely divided carbon (having an average ultimate particle size of less than 1 micron). This relatively large amount of carbon must be held together and bound to the "barrier" layer or coating (described above) by means of one or more polymeric materials having the following characteristics:

(1) In its coated condition it must be substantially insoluble in water.
(2) In one preferred embodiment of this invention, the "opaque coating" polymer must be initially soluble in water to the extent of at least about 5 weight percent.
(3) This preferred "opaque coating" polymer must also have the ability to be convertible into a water insoluble polymeric coating after it is applied in the form of an aqueous solution, for example by "curing" or being "cross-linked."
(4) The viscosity of a water solution of such a preferred "opaque layer" polymer (at a level of 5 weight percent in distilled water at 25° C.) must be at most about 10 poises.
(5) The resulting water-insoluble "opaque" coating must be fairly permeable to water, having the ability to permit water to pass through it to dissolve the "barrier" polymer(s) without itself being broken up or dissolved.
(6) It must have a high degree of elasticity to both minimize curl and to hold itself together during the extreme bending and torsion conditions to which the final film units of the invention must be subjected. Hence, it must have a Young's modulus (in tension) between about 400 and about 5000 pounds per square inch.

Of those polymeric materials meeting the above requirements, the alkali metal salts (preferably sodium) of copolymers of ethyl acrylate and acrylic acid such as those made in accordance with the processes described in U.S. Pat. 3,062,674, having intrinsic viscosities of at least about 0.3 in methanol (preferably within the range of from about 0.5 to about 1) are particularly preferred. Intrinsic viscosities described herein are measured at 25° C.

In the "opaque" coatings of this invention, the weight ratio of polymer to carbon can be varied to some extent, depending somewhat upon the particular particle size of the carbon that is dispersed through the polymeric material. However, generally the weight ratio of polymer to carbon in this "opaque" coating should be within the range of from about 1.2 to 1 to about 9 to 1, and preferably should be within the range of from about 3 to 2 to about 2.3 to 1, respectively. If desired, mixtures of polymers can also be used in this "opaque" layer to achieve particularly desired results. Other materials such as plasticizers, cross-linking agents, dyes (and even conventional "Intensifiers" when the film unit, for example, is designed for use for radiography work with X-rays), and the like can also be present in the "opaque" coatings of this invention, so long as relatively minor amounts of such materials are utilized. In any event, the "opaque coating" polymer(s) must make up at least 50 weight percent (preferably at least about 60 weight percent) of the "opaque" coating. The total weight of the "opaque" coating can also vary over a fairly wide range. However, to meet the stringent requirements of the usage detailed above (relating to the "film packs"), the "opaque" coating should be at most about 1 mil in thickness and be present in amounts ranging from about 0.2 to about 0.8 pound per 100 square feet of film surface (when, for example, it is on only one side of the film).

In Example 2, below, the application of an "opaque" coating consisting essentially of the particularly preferred sodium salt of ethyl acrylate-acrylic acid copolymers is detailed. Note that in all of the present examples, all parts given are by weight unless otherwise specified.

EXAMPLE 2

A polymer solution is prepared by stirring together the following in a conventional mixing vessel:

| Ingredient: | Parts |
| --- | --- |
| Distilled water | 86 |
| Polymer [1] | 10 |
| Isopropyl alcohol | 2 |
| n-Butyl alcohol | 2 |
| Surfactant [2] (wetting agent) | 0.4 |

[1] Sodium salt of copolymer of ethyl acrylate and acrylic acid (intrinsic viscosity of 0.7 in methanol).
[2] Sodium salt of alkyl aryl polyether sulfonate.

Into the resulting solution are then slowly added 7 parts of carbon black the particles of which have a mean diameter of about 22 millimicrons. This dispersion is then milled for 90 minutes in a conventional high intensity dispersion mill and then diluted further with 70 parts of distilled water. Just before the "opaque" layer is applied to the film, 0.5 part of 1, 4 butanediol diglycidyl ether (a bis epoxide), a cross-linking agent (used for its ability to react with the polymer to thereby convert it into a water-insoluble form) is stirred into the black dispersion. If desired, any other reactive cross-linking agent such as polyaziridine can be used either with the bis epoxide, or in place of it. The resulting dispersion, which has a viscosity at room temperature of about 100 centipoises, is coated over the "barrier" layer of Example I at a rate of 2.5 pounds per 100 square feet of film surface, and then dried for 10 minutes at a temperature of 105° F. The thickness of the resulting dry "opaque" coating is only 0.3 mil. Yet its optical density through the entire visible spectrum is more than 8.5.

Upon being immersed in distilled water for 30 seconds the "opaque" coating is readily removable in a single piece. "Film units" made from the coated film perform satisfactorily in a conventional "film pack" type camera, having excellent flexibility and exhibiting essentially no crazing or flaking in actual use.

It should be noted that, while it is preferred that the "opaque" coating of the present invention be applied over the "barrier" coating by means of aqueous solutions of the mixtures of polymer(s), carbon, and other additives (where desired or appropriate), they can also be applied via conventional organic solvent techniques, in which the polymer is dissolved in the organic solvent (such as, for example, butyl alcohol, methyl ethyl ketone, methylene chloride, ethyl alcohol, xylene, perchloroethylene, and the like, as well as mixtures thereof). By utilizing such organic solvent techniques polymers that are suitable for use as "opaque coating" polymers (as described above) that are not initially soluble in water can be used. Cellulose acetate is an example of such useful water insoluble polymers that have the necessary functional properties (as outlined hereinbefore) to be acceptable as the major component in the "opaque" coating, but which is not initially soluble in water. In the case of cellulose acetate, a preferred organic solvent for its application over the "barrier" coating is a mixture of acetone and methyl or ethyl alcohol. When organic solvents are used, the carbon can simply be well dispersed through the solvent system by any of several well-known methods before the coating is applied. Then, the organic solvent is simply evaporated from the coated surface to yield the desired "opaque" coating. In view of the broad knowledge in the art regarding organic solvent systems for various polymers, it is believed that a detailed discussion herein of this particular procedure of applying the "opaque" and "barrier" coatings of this invention is not necessary.

EXAMPLE II

A solution of 100 parts of cellulose acetate (acetyl content of 40%, intrinsic viscosity in acetone of 1.2) in a mixture of 1440 parts of acetone and 160 parts of methanol is prepared by simply stirring the ingredients together at about 35° C. for 2 hours. To the resulting solution are added 300 parts of carbon black. The suspension of carbon in organic solvent is milled in a conventional "Kady" type high intensity mill for 15 minutes. To this solution is added 200 additional parts of the cellulose acetate (dissolved in a mixture of 900 parts of acetone and 100 parts of methanol). The resulting susepnsion is then coated (at a rate of 2 pounds of the 10.3 weight percent solution per 100 square feet of film surface) on the film coated with the "barrier" coating of Example I above and dried immediately. The wet stripping and dry adhesion properties of the resulting coated film is excellent.

EXAMPLE III

A film unit having an "opaque" coating is prepared as in Example II above, except that additionally, 30 parts of diethyl phthalate (a plasticizer) are dissolved into the coating solution before it is applied to the film. The resulting film also has excellent dry adhesion and wet stripping properties.

Apparently, the presence of so much carbon of such very small particle size in the "opaque" layer contributes considerably to the necessary water permeability of the "opaque" layers of this invention. This can be more readily appreciated when it is realized that cellulose ester coatings, per se, are fairly water-impermeable. Yet, with the carbon contents of the present invention, adequate water permeability of the resulting "opaque" layer results. Hence, while adequate water permeability is an important criterion for the "opaque" coatings of this invention, such permeability is practically assured when at least the preferred amounts of carbon are used in the "opaque" coating or layer.

EXAMPLE IV

A film unit having an "opaque" coating is prepared as in Example II. Over the "opaque" layer is then coated a solution containing the following ingredients:

| Material: | Parts |
|---|---|
| Polymethacrylate beads [1] | 10 |
| Carbon black [2] | 12 |
| "½ second" cellulose nitrate | 12 |
| Acetone | 300 |
| Methyl alcohol | 675 |

[1] Average particle diameter=5 microns; modified with 5% divinyl benzene; prepared as in U.S. Pat. 2,701,245.
[2] Mean particle diameter equals about 100 millimicrons.

This coating solution (a dispersion of carbon and beads in a solution of cellulose nitrate) is coated at a rate of 8 pounds per 1000 square feet of film surface. The resulting coated film is dried for 2 minutes in a drying oven at a temperature of 250° F. The frictional properties of "film units" made from the resulting coated film are excellent, and are significantly better (i.e. the friction generated between sheets of film in a conventional film pack is lower) than those of film units that do not have the last coating.

Anti-friction and anti-blocking coatings

While "film units" having the "barrier" and the "opaque" coatings of the present invention generally perform well in the "film packs" described above, it has been found that the "frictional" properties of such film units can be still further improved by utilizing a thin additional coating (over the "opaque" coating) of an "anti-friction" coating such as those described in detail in U.S. patent application Ser. No. 596,803, filed Nov. 25, 1966 or in U.S. Pat. No. 3,295,979. In this patent appplication are described coatings that are comprised of a blend of (a) from about 0.5 to about 10 percent of substantially spherical polymeric beads having average diameters of from about 0.5 to about 25 microns; (b) from about 0.3 to about 8 percent of low viscosity cellulose nitrate, and (c) from about 0.3 to about 8 percent of finely divided carbon; all of which can be coated from an organic solvent system. For the purpose of detailing the preferred "anti-friction" coating portion of some of the preferred film units of this invention, the disclosure of U.S. Ser. No. 596,803, filed Nov. 25, 1966, is hereby incorporated by reference into the present disclosure. It should be noted, however, that the presence of such an "anti-friction" coating is not necessary for the successful practice of the present invention.

In U.S. Pat. No. 3,295,979 are described coatings that are composed of (a) casein, (b) 1–10%, based on the dry weight of the casein, of a compound having the formula:

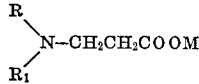

wherein R is an aliphatic hydrocarbon group containing from 10 to 18 carbon atoms, R₁ is selected from the group consisting of hydrogen and aliphatic hydrocarbon groups containing from 10 to 18 carbon atoms, and

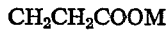

and M is either H or a cation, and sometimes (C) from about 1 to about 3% based on the dry weight of the casein, of a matting agent or a chemical hardener; all of which can be coated in accordance with the processes described in U.S. Pat. 3,295,979, the disclosure of which is hereby incorporated by reference into the present disclosure.

EXAMPLE V

In accordance with the procedures detailed above, a 5 mil cellulose acetate film support is coated successively with the following layers (each layer being dried before the next is applied): (a) gelatin (40 grams/100 sq. ft.)+ formaldehyde (0.4 g./100 sq. ft.), (b) hydroxypropyl cellulose (7 g./100 sq. ft.)+sodium ethyl cellulose sulfate (15 g./100 sq. ft.), (c) ethyl acrylate/acrylic acid copolymer (60 g./100 sq. ft.)+carbon black (40 g./100 sq. ft.) +1,4-butanediol-diglycidyl ether (5 mg./100 sq. ft.) and (d) casein (10 g./100 sq. ft.), N-tallow-beta-amino-dipropionate (0.4 g./100 sq. ft.), polymethacrylate beads (75 mg./100 sq. ft.), and dioctyl sulfosuccinate (0.2 g./ 100 sq. ft.). On the reverse side of the cellulose acetate film support are coated (1) a conventional panchromatically sensitized high speed silver bromoiodide gelatin emulsion and (2) a conventional gelatin overcoat.

Layer or coating (d) in Example V is typical of the friction reducing, anti-static treatments set out in the disclosure of U.S. Pat. No. 3,295,979. The wet stripping and dry adhesion properties of the resulting coated film is excellent.

As it was indicated at the outset of this disclosure, the coatings of the present invention are also useful as photographic film coatings for sensitized films other than the "film units." Thus, they can serve to protect, for example, X-ray or other radiographic film from visible light, and can, of course, be readily removable from such films in single units when such removal is desired. They can also serve to protect motion picture film from incident light where extra "backing" protection from light might be needed temporarily, until the film is developed. In the case of X-ray films, the permeability of the "opaque" coating will permit developers to pass through the black coating and carry out the development of the exposed film to a significant extent before the "opaque" coating is removed. When the preferred "barrier" layers of this invention are used (wherein the polymer(s) are not soluble in concentrated aqueous solutions) the development can be completed while the "opaque" and "barrier" layers of this invention remain essentially intact. However, these coatings can be removed quickly when such removal is desired by simply rinsing or immersing the developed film with either pure water or a relatively dilute aqueous solution. The amount of polymeric materials in the "barrier" layers of the coated films of this invention can vary considerably, but should generally be within the range of from about 0.03 to about 2 pounds per 100 square feet of individual film surface covered thereby, and preferably should be within the range of from about 0.04 to about 0.1 pound per 100 square feet.

We claim:
1. An article of manufacture comprising a polymeric film base having over at least one surface thereof a multiple-layer coating; said multiple-layer coating comprising
   (a) a first barrier layer consisting essentially of at least one water soluble polymer that is compatible with gelatin and provides, in the dry state only, a tight bond between said film base sheet and the opaque layer (b) below, and is insoluble in water solutions containing more than 5 weight percent of dissolved ionizable material; and
   (b) an opaque layer that is (1) substantially impervious to visible light, (2) insoluble in water, and (3) permeable to liquid water when said article is contacted with said water; said opaque layer consisting essentially of a blend of finely divided carbon and at least one water-insoluble organic polymer having a high degree of elasticity and the amount of said water-insoluble organic polymer in said blend being at least about 50 weight percent of said blend.
2. An article of manufacture as in claim 1, wherein said barrier layer consists essentially of a member of the group consisting of alkali metal salts of ethyl cellulose sulfates, hydroxylpropyl celluloses, alkali metal salts of acrylic acid/ethylacrylate copolymers, carboxymethylcelluloses, alkali metal salts of methyl acrylate/acrylic acid copolymers, and mixtures thereof; and wherein said opaque layer consists essentially of a blend of said finely divided carbon and a member selected from the group consisting of cellulose esters, cross-linked ethyl acrylate/acrylic acid copolymers having an intrinsic viscosity in methanol of at least about 0.3 and mixtures thereof.

3. An article of manufacture as in claim 1, wherein said barrier layer consists essentially of a blend of sodium ethyl cellulose sulfate and hydroxypropyl cellulose; the amount of said sodium ethyl cellulose sulfate in said blend being at least about 15 weight percent and the amount of said blend being from about 0.03 to about 2 pounds per 100 square feet of said article of manufacture.

4. An article of manufacture as in claim 3, wherein the weight ratio of said sodium ethyl cellulose sulfate to said hydroxypropyl cellulose is from about 1:2 to about 2:1, respectively.

5. An article of manufacture as in claim 3, wherein said opaque layer consists essentially of from about 10 to about 45 weight percent of carbon having an average particle diameter of at most about 1 micron and at least about 60 weight percent of said water-insoluble organic polymer.

References Cited

UNITED STATES PATENTS

| | | | |
|---|---|---|---|
| 1,116,479 | 11/1914 | Planchon | 96—84 |
| 1,994,875 | 3/1935 | Schneider et al. | 96—84 |
| 2,319,080 | 5/1943 | Nadeau et al. | 96—84 |
| 3,237,008 | 2/1966 | Dostes et al. | 96—84 |
| 3,295,979 | 1/1967 | Secrist et al. | 96—87 |

FOREIGN PATENTS

| | | | |
|---|---|---|---|
| 633,936 | 12/1949 | Great Britain | 96—84 |
| 729,924 | 5/1955 | Great Britain | 96—84 |

RONALD H. SMITH, Primary Examiner

U.S. Cl. X.R.

117—34; 96—84 R, 87 R